UNITED STATES PATENT OFFICE.

RALPH MARTIN, OF ST. PAUL, MINNESOTA, ASSIGNOR OF ONE-HALF TO HOPEWELL CLARKE, OF SAME PLACE.

PHOTOGRAPHIC SALTING SOLUTION.

SPECIFICATION forming part of Letters Patent No. 560,003, dated May 12, 1896.

Application filed June 8, 1894. Serial No. 513,933. (No specimens.)

*To all whom it may concern:*

Be it known that I, RALPH MARTIN, of St. Paul, Ramsey county, Minnesota, have invented certain Improvements in Photographic Presensitizing Solutions for Textile Fabrics, of which the following is a specification.

My invention relates to improvements in solutions for the presensitizing of textile fabrics to receive positive photographic prints, its object being to provide a composition which is translucent in solid or dried form, and which when applied to the fabric renders it capable of being sensitized for printing, and which after the printing can be entirely washed out of the fabric by the use of cold water, so as to leave nothing but the indelible dye of the print in the tissues of the fabric. To accomplish this, it is essential to employ as one ingredient of the composition a non-mercuric chlorid which is soluble in water, and in which the chlorin has a stronger affinity for the silver in silver nitrate than it has for its own base or the bases for each other, and which will therefore combine with the sensitizing silver nitrate of the bath. It is also necessary to use as a vehicle for this chlorid a translucent gum also easily soluble in cold water and quickly drying, by means of which the chlorid is held, as it were, in suspense in the mass of the gum in and upon the fabric, so as to be acted upon by the silver nitrate in the sensitizing operation. When the fabric after treatment with this solution is floated upon the sensitizing-bath, the gum is softened so that the silver nitrate of the bath penetrates the mass of the gum and the tissues of the fabric and unites with the chlorin of the chlorid and is transformed upon exposure to the light into an indelible dye, permeating the fabric. The materials best adapted for this purpose are gum-arabic and sodium chlorid, both being inexpensive and readily soluble in water, the solution thus made being transparent and the dried mass translucent.

The composition is compounded in substantially the following proportions: gum, three scruples; chlorid, fifteen grains, and distilled water, four ounces. The fabric is first soaked in this solution, then dried, floated upon the sensitizing-bath, again dried, and then printed upon, after which the gum is thoroughly washed out of the fabric by means of cold water, leaving the print dyed in the tissues of the fabric.

I claim—

1. The herein-described composition of matter for preparing textile fabrics for receiving positive photographic prints, consisting of water, a translucent vegetable gum soluble in cold water, and a non-mercuric chlorid also soluble in cold water, the chlorin of which has stronger affinity for the silver in silver nitrate than it has for its own base or than its base has for the silver of the nitrate.

2. The herein-described composition of matter for preparing textile fabrics for receiving positive photographic prints, consisting of water, a translucent vegetable gum soluble in cold water, and sodium chlorid, in substantially the proportions specified.

3. The herein-described composition of matter for preparing textile fabrics to receive positive photographic prints, consisting of water, gum-arabic, and a non-mercuric chlorid soluble in cold water, the chlorin of which has stronger affinity for the silver in silver nitrate than it has for its own base, or than its base has for the silver of the nitrate.

4. The herein-described composition of matter for preparing textile fabrics to receive positive photographic prints, consisting of gum-arabic, sodium chlorid and water, in substantially the proportions specified.

In testimony whereof I affix my signature in presence of witnesses.

RALPH MARTIN.

Witnesses:
T. D. MERWIN,
H. S. JOHNSON.